(12) United States Patent
Ross

(10) Patent No.: US 11,918,159 B2
(45) Date of Patent: Mar. 5, 2024

(54) GLASS CLEANING DEVICE

(71) Applicant: William Ross, Guelph (CA)

(72) Inventor: William Ross, Guelph (CA)

(73) Assignee: William Ross, Guelph (CA)

(*) Notice: Subject to any disclaimer, the term of this patent is extended or adjusted under 35 U.S.C. 154(b) by 0 days.

(21) Appl. No.: 17/462,574

(22) Filed: Aug. 31, 2021

(65) Prior Publication Data

US 2022/0071457 A1 Mar. 10, 2022

Related U.S. Application Data

(60) Provisional application No. 63/074,508, filed on Sep. 4, 2020.

(51) Int. Cl.
*A47L 1/06* (2006.01)
*B60S 3/04* (2006.01)

(52) U.S. Cl.
CPC ............. *A47L 1/06* (2013.01); *B60S 3/045* (2013.01)

(58) Field of Classification Search
CPC ...... B60S 1/4003; B60S 1/387; B60S 1/3863; B60S 1/38; B60S 3/045; A47L 13/12; A47L 13/51; A47L 1/06

USPC ........................................ 15/236.02, 250.39
See application file for complete search history.

(56) References Cited

U.S. PATENT DOCUMENTS

| | | | |
|---|---|---|---|
| 5,233,721 A * | 8/1993 | Yang ................. | B60S 1/3801 15/250.41 |
| 10,350,646 B1 * | 7/2019 | Nichols, Jr. ........ | A47L 13/022 |
| 2006/0032010 A1 * | 2/2006 | Francois ............ | A47L 1/16 15/245 |
| 2012/0144616 A1 * | 6/2012 | Kim ................... | B60S 1/4009 15/250.32 |

* cited by examiner

*Primary Examiner* — Katina N. Henson
(74) *Attorney, Agent, or Firm* — Gowling WLG (Canada) LLP

(57) ABSTRACT

A glass cleaning device including a handle and an attachment adaptor provided to the handle. The attachment adaptor may be affixed to the handle or may be configured to be sold separately and may also be configured to be removable from the handle. The attachment adaptor is configured to attach to a replaceable windshield wiper blade of the type conventionally available for vehicles. In some cases, the glass cleaning device may include a windshield wiper blade together with the handle and/or the attachment adaptor. In some cases, the handle is extendible. The ability to use commercially available windshield wiper blades allows a large selection of easily available replacements or options for the cleaning head of the glass cleaning device.

6 Claims, 15 Drawing Sheets

GLASS CLEANING DEVICE

RELATED APPLICATIONS

This application claims priority to U.S. Provisional Patent Application No. 63/074,508 filed on Sep. 4, 2020, which is hereby incorporated herein by reference.

FIELD

This document relates to a glass cleaning device and, in particular, to a glass cleaning device having a replaceable blade configured for curved windows and windshields.

BACKGROUND

Window/glass cleaning is conventionally performed using squeegees or the like. In the past several years, more and more vehicles and buildings are making use of curved glass for windows and windshields. While some vehicles have windshield wipers that are designed to follow the curves of the windshields, there are often areas on the windshield that are not cleaned by the windshield wipers. In some cases, such as on buses, aircraft or industrial vehicles, it can also be hard to reach these areas due to the height or overall size of the windshield or due to the curved nature of the windshield. Similarly, on buildings, there are more and more curved windows that can be hard to reach and are difficult to clean with conventional squeegees.

As such, there is a need for an improved glass cleaning device.

SUMMARY

According to an aspect herein there is provided a glass cleaning device including a handle and an attachment adaptor provided to the handle. The attachment adaptor is also configured to attach to a replaceable windshield wiper blade of the type conventionally available for vehicles. In some cases, the handle may come preformed with the attachment adaptor while in other cases, the attachment adaptor may be sold separately. In some cases, the glass cleaning device may include an initial windshield wiper blade together with the handle and the attachment adaptor. In some cases, the handle is extendible. In some cases, the attachment adapter is removable. In some cases, the attachment adaptor is configured to attach to the handle via a threaded bore. In some cases, the attachment adaptor is tapered from an end nearest the bore to an end opposite the end nearest the bore.

In some cases, the attachment adaptor is configured to attach to the replaceable wiper blade via a pin. In some cases, the pin includes a filleted top. In some cases, the attachment adaptor is configured to attach to the replaceable wiper blade via a shaped slot, a bayonet arm, a push button arm, or a pin and hook arm. In some cases, the attachment adapter may comprise a set of a plurality of attachment adapters. In some cases, each of the plurality of attachment adapters is configured to attach to a different style of replaceable windshield wiper blade. In some cases, the glass cleaning device includes an initial windshield wiper blade attachable to the attachment adapter.

According to an aspect herein there is provided an attachment adaptor for a glass cleaning device. The attachment adapter configured to attach to a handle of the glass cleaning device at a first end. The attachment adaptor is also configured to attach to a replaceable windshield wiper blade of the type conventionally available for vehicles at a second end.

Other aspects and features of embodiments herein will become apparent, to those ordinarily skilled in the art, upon review of the following description of some exemplary embodiments.

The drawings included herewith are for illustrating various examples of articles, methods, and apparatuses of the present specification and are not intended to limit the scope of what is taught in any way. In the drawings:

DETAILED DESCRIPTION

Various apparatuses or processes will be described below to provide example embodiments. No embodiment described below limits any claims and any claim may cover elements that are not described in each, all or any embodiment. The claims are not limited to elements of any one embodiment described below or to elements common to multiple or all of the embodiments described below. The applicants, inventors or owners reserve all rights that they may have in any elements disclosed herein whether or not claimed, for example the right to claim in a continuing application and do not intend to abandon, disclaim or dedicate to the public any elements by disclosure in this document.

Generally speaking, embodiments herein provide a glass cleaning device that is extendable and allows for easy attachment of windshield wiper blades to allow effective cleaning of curved glass surfaces.

Figure 1:
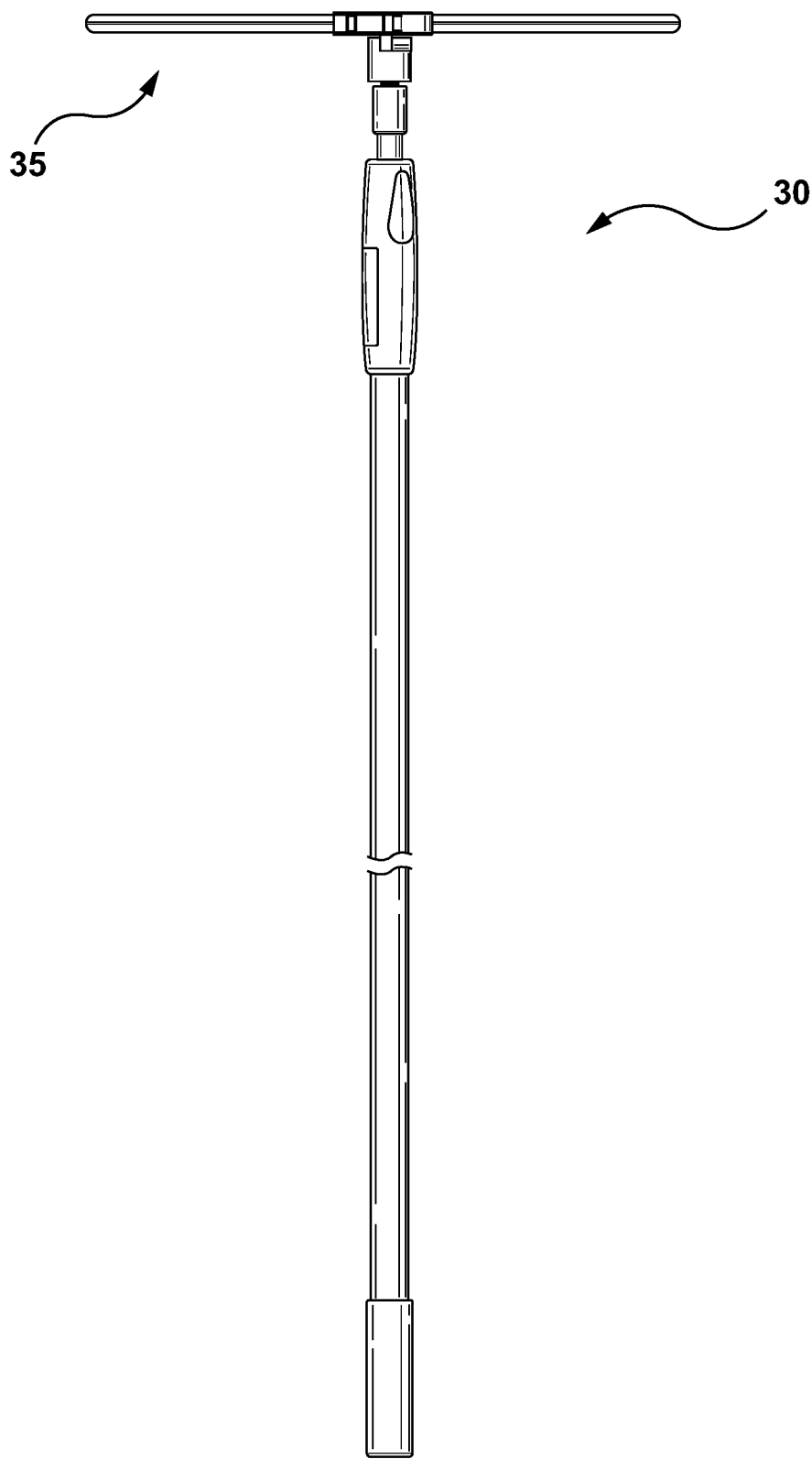
FIG. 1 shows a glass cleaning device and windshield wiper blade according to an embodiment.
Figure 2:
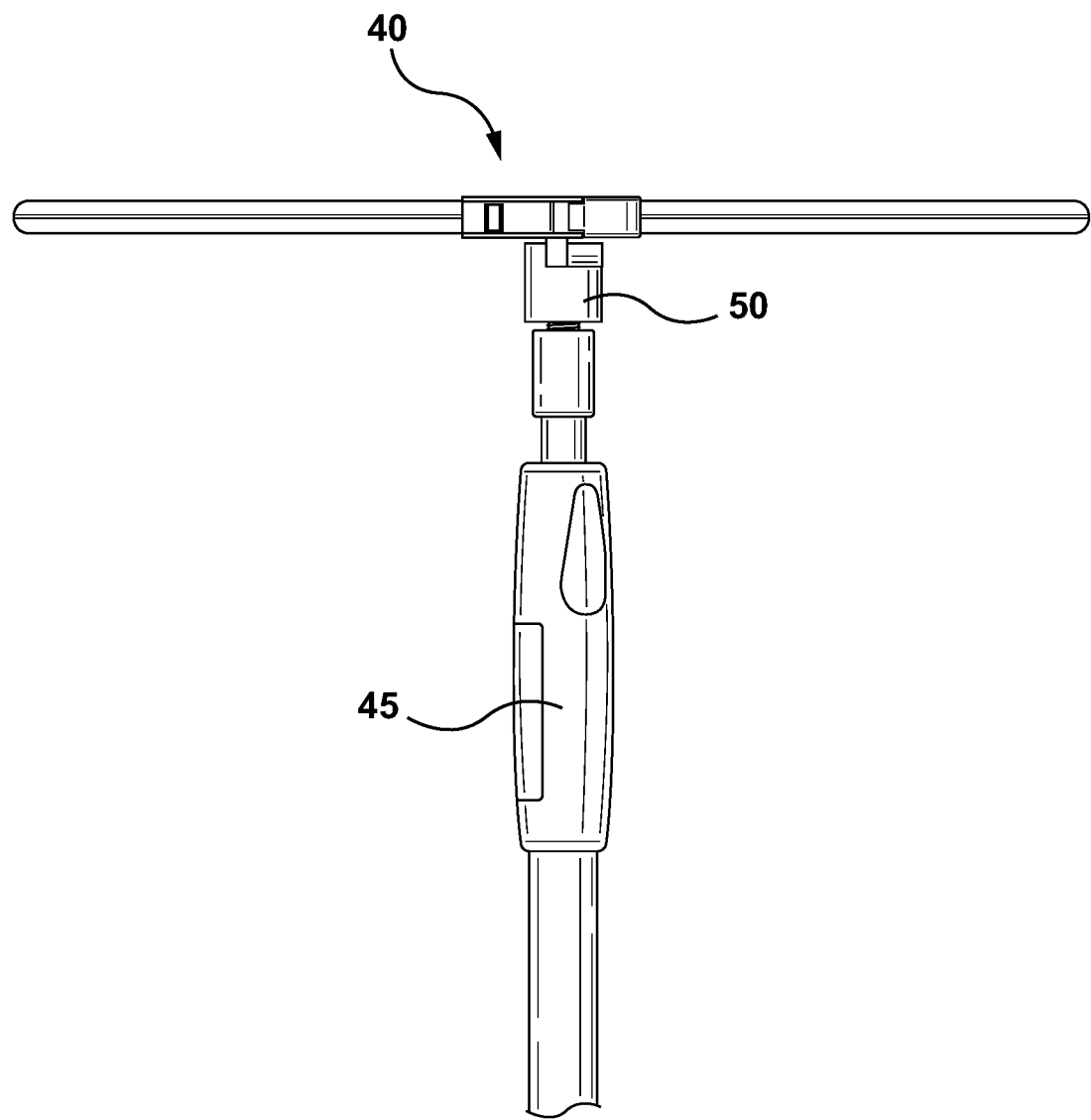
FIG. 2 shows a close up view of a head of the glass cleaning device of FIG. 1.
Figure 3:
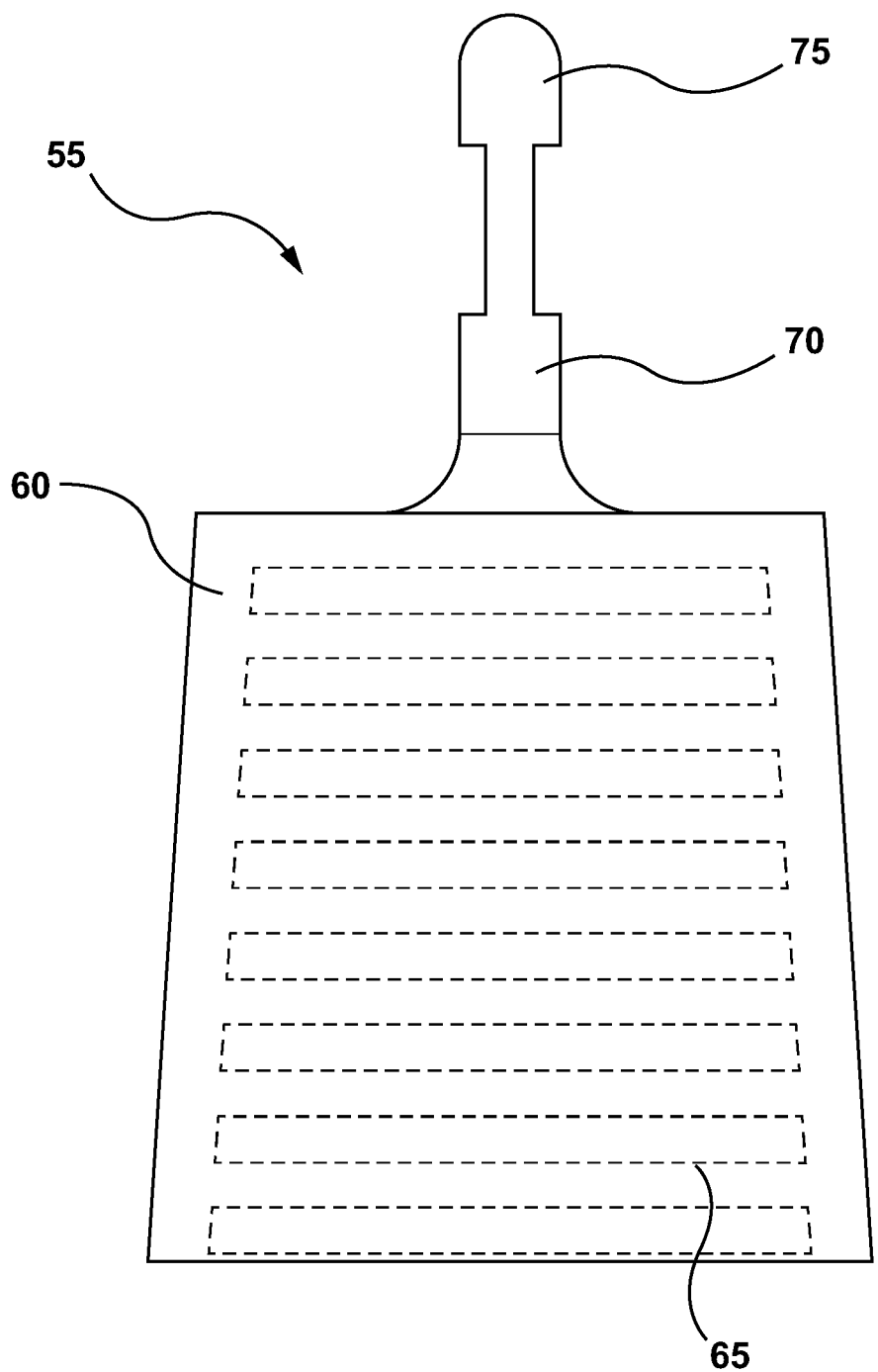
FIG. 3 shows a side view of a pin style attachment adapter according to an embodiment.
Figure 4:
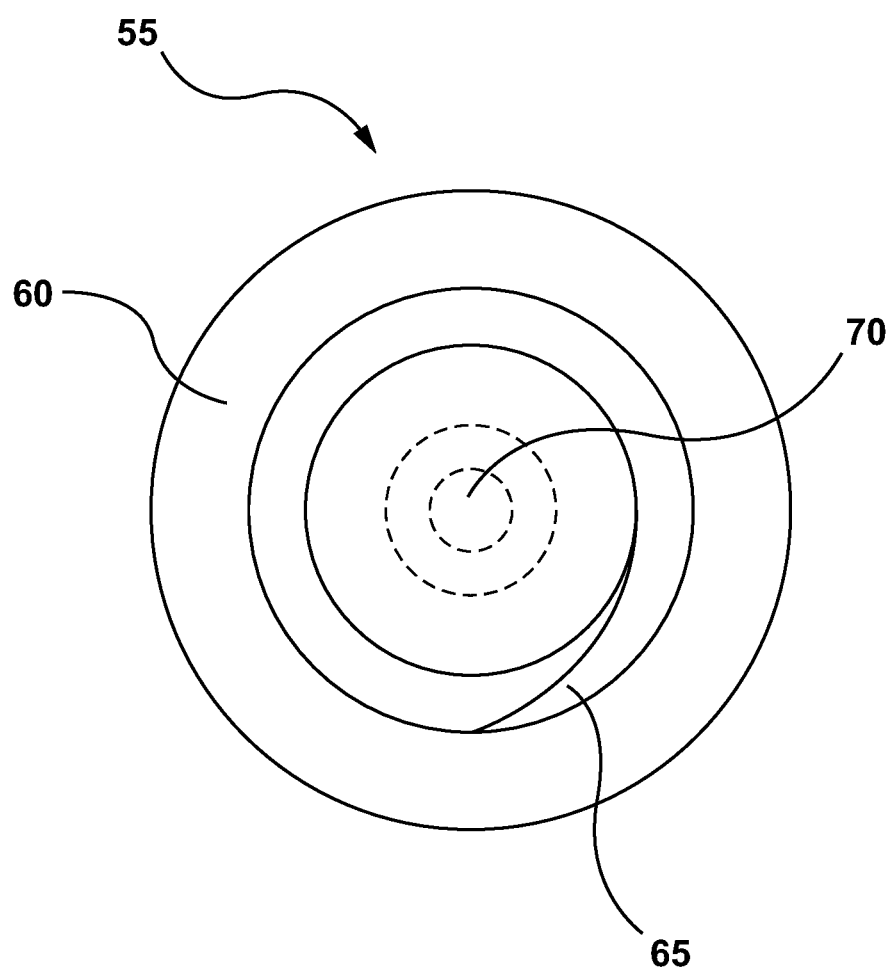
FIG. 4 shows a bottom view of the pin style attachment adapter of FIG. 3.
Figure 5:
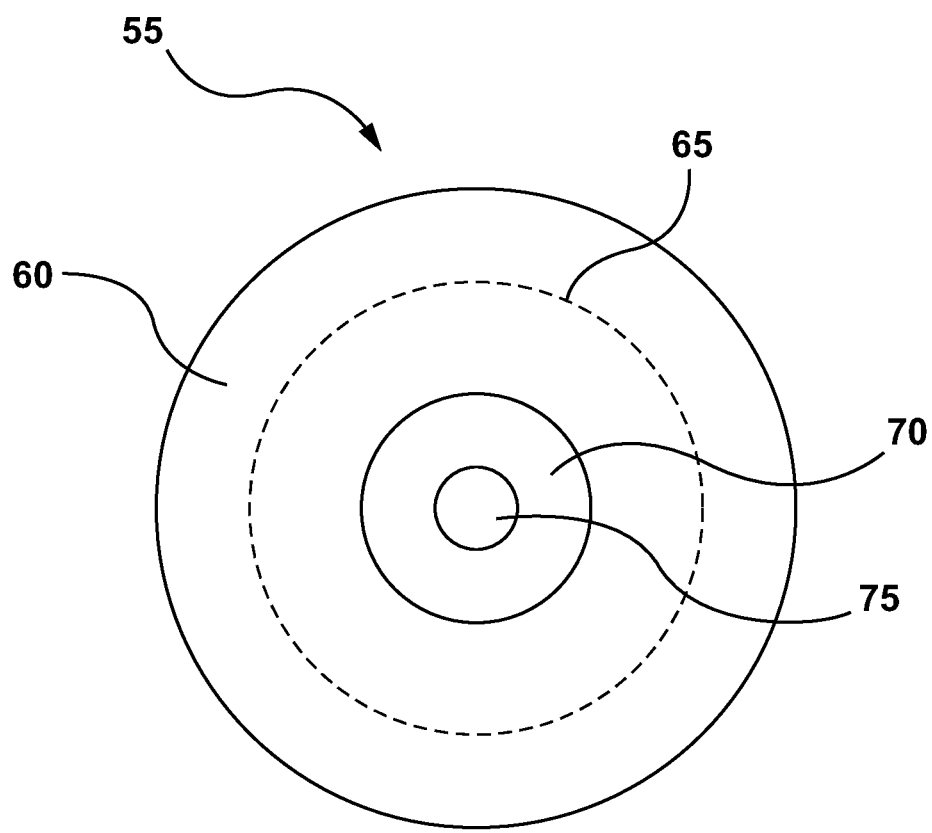
FIG. 5 shows a top view of the pin style attachment adapter of FIG. 3.
Figure 6:
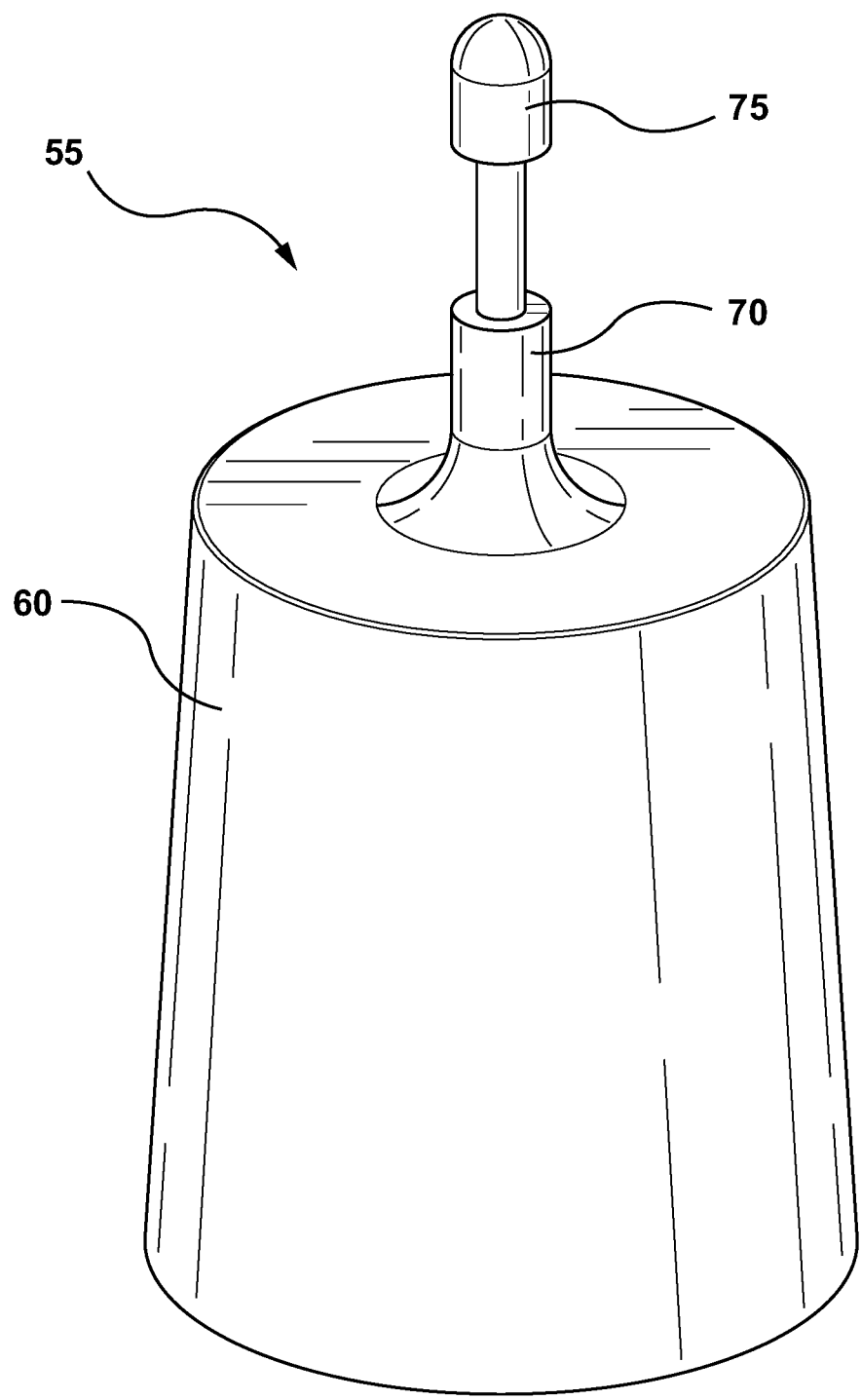
FIG. 6 shows a perspective view of the pin style attachment adapter of FIG. 3.
Figure 7:
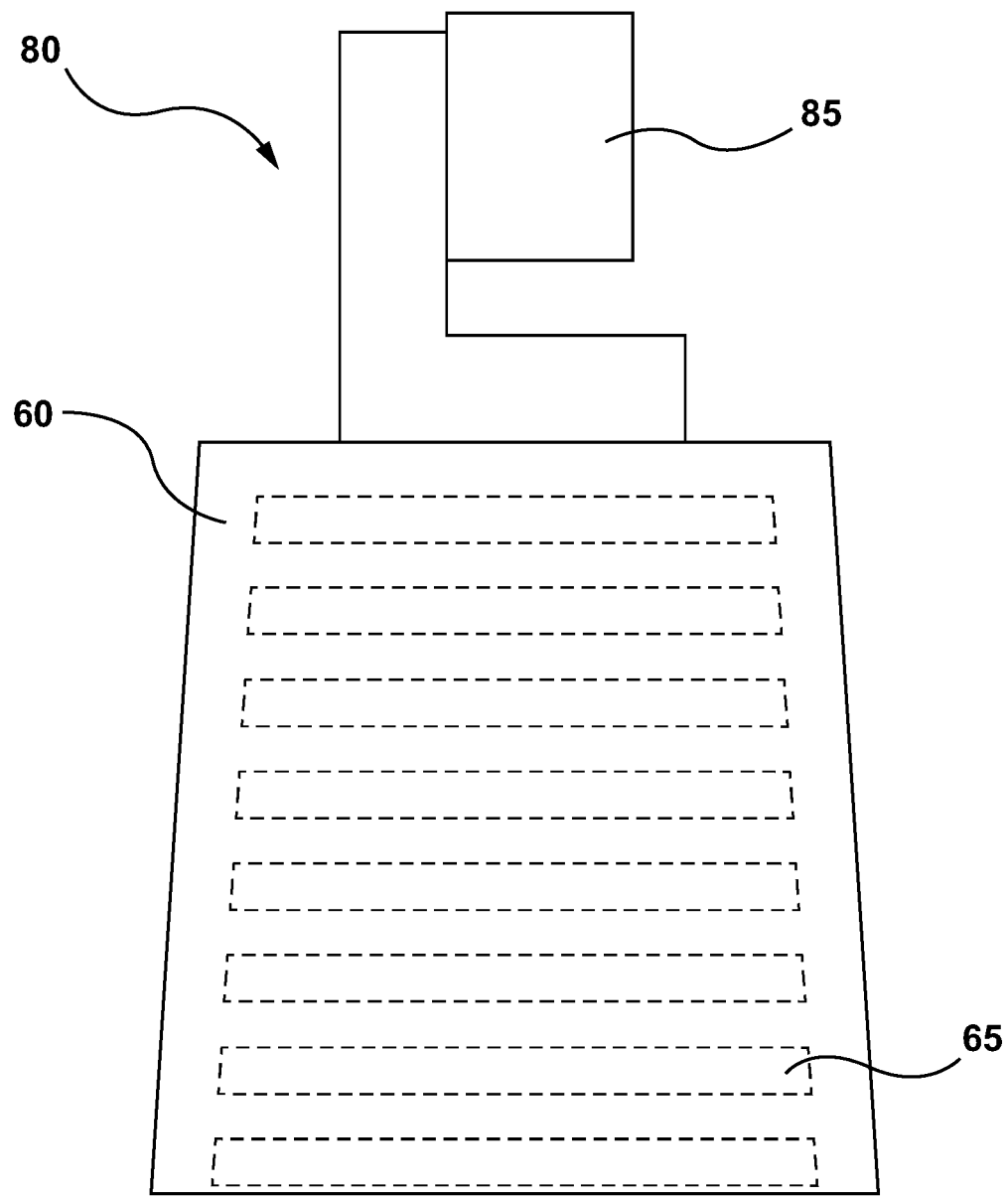
FIG. 7 shows a left side view of a J-clip style attachment adapter according to an embodiment.
Figure 8:
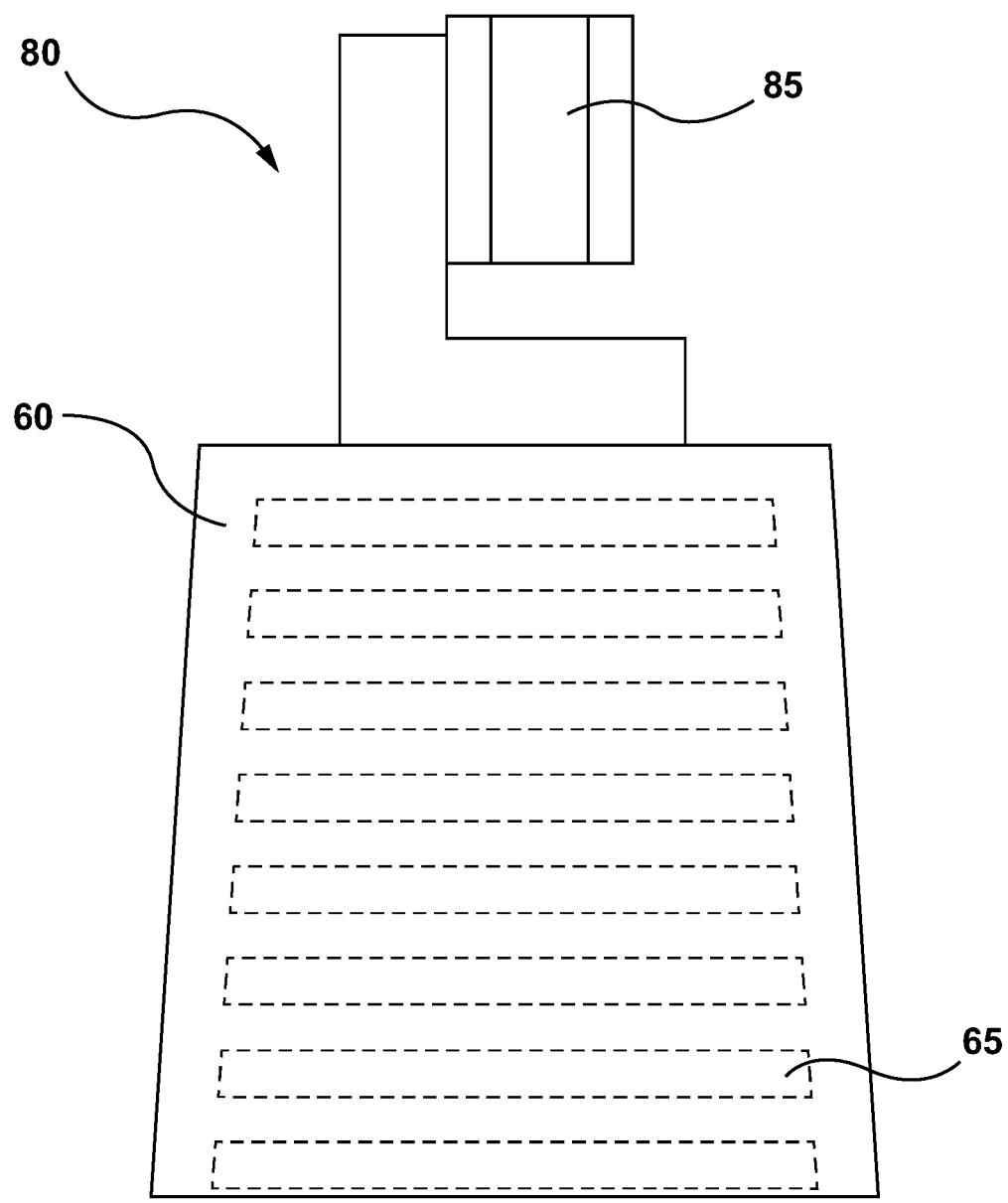
FIG. 8 shows a right side view of the J-clip style attachment adapter of FIG. 7.
Figure 9:
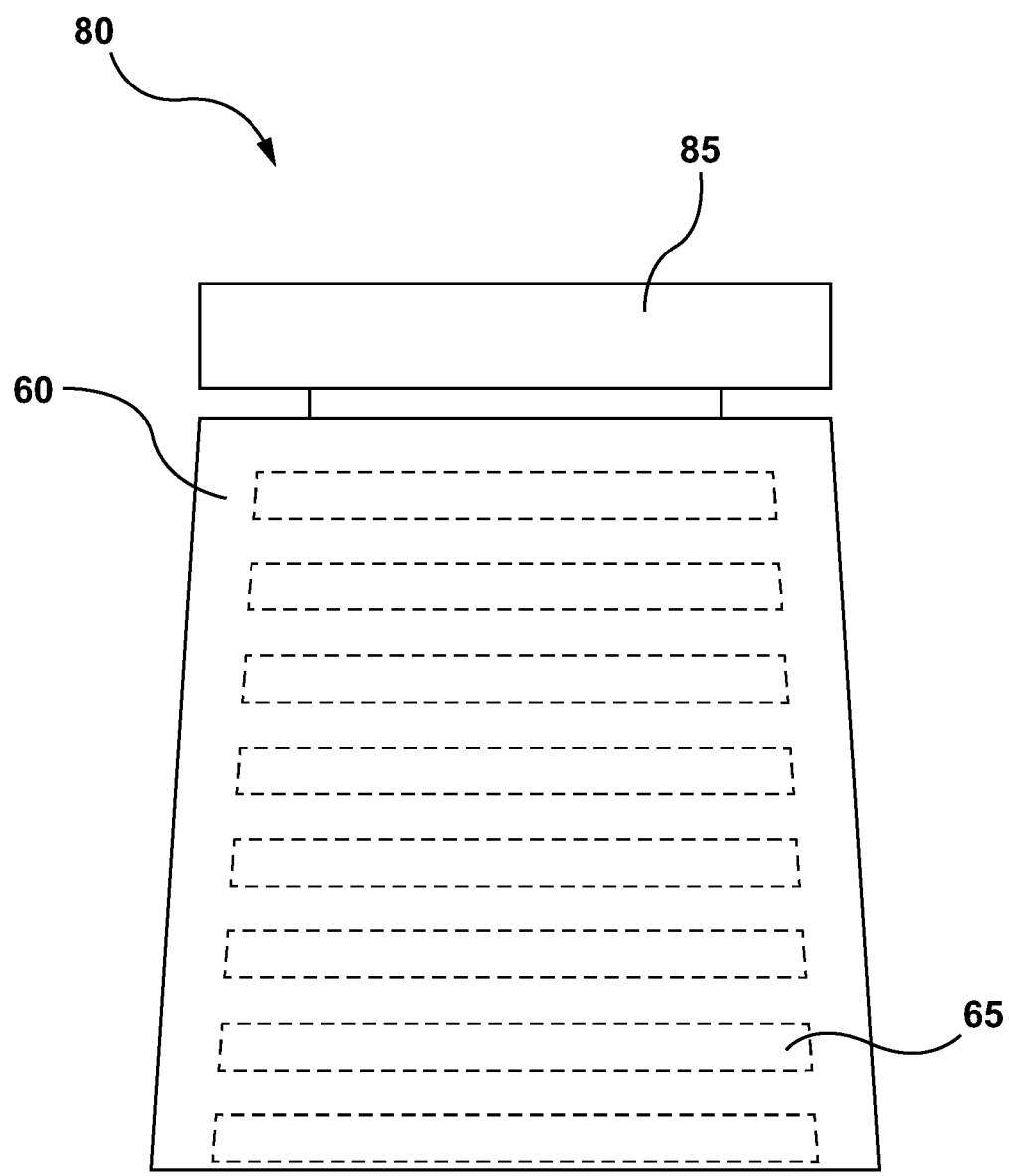
FIG. 9 shows a front view of the J-clip style attachment adapter of FIG. 7.
Figure 10:
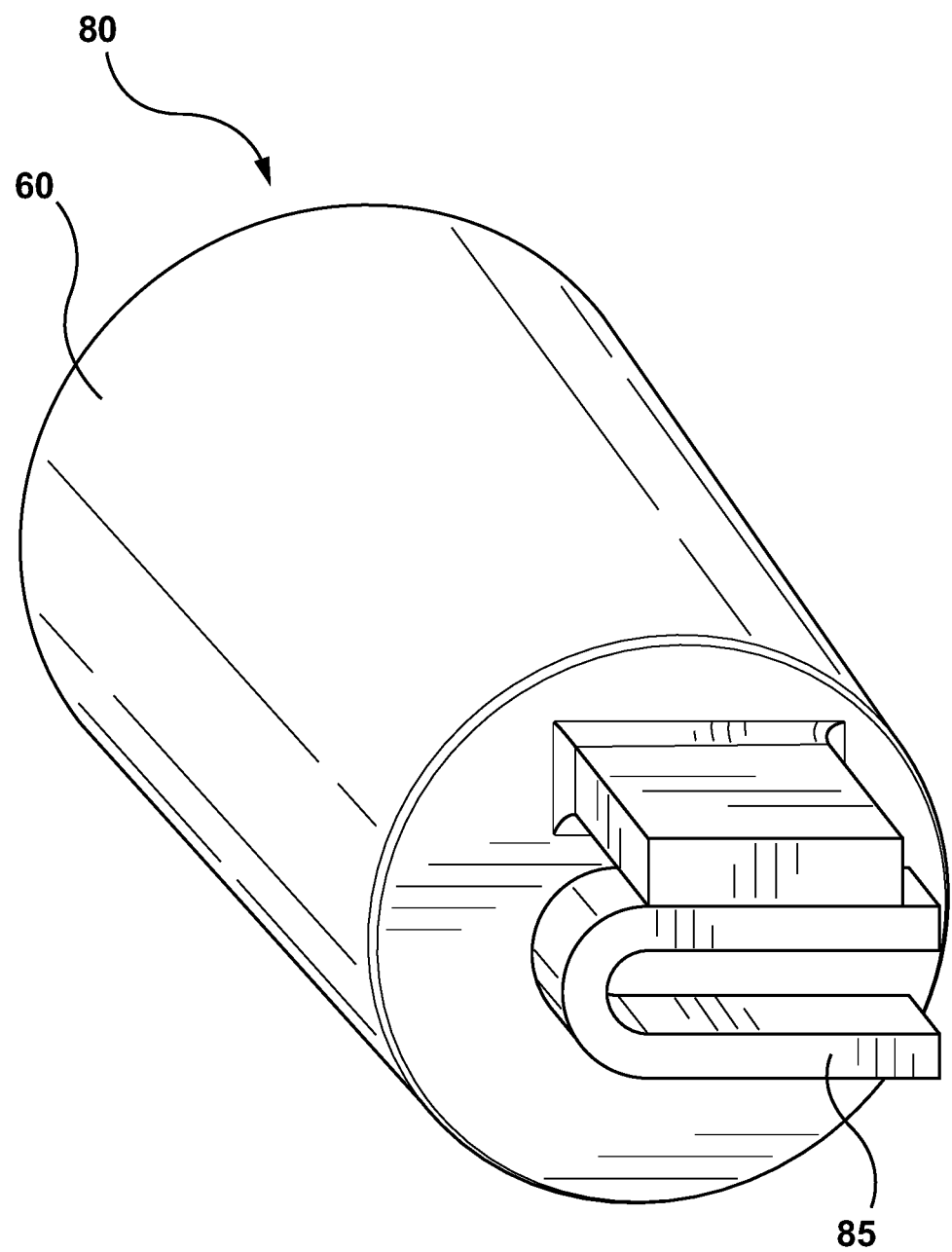
FIG. 10 shows a perspective view of the J-clip style attachment adapter of FIG. 7.

FIG. 1 shows a glass cleaning device 30 and windshield wiper blade 35 according to an embodiment. FIG. 2 shows a close up view of a head 40 of the glass cleaning device of FIG. 1. The glass cleaning device includes a handle 45, which may be an extendable handle, and an attachment adapter 50. The windshield wiper blade 35 may in some cases be supplied as a part of the glass cleaning device 30 and, in other cases, be supplied separately or as a replacement part. The attachment adapter 50 is configured to attach to the handle 45 and also to allow attachment of one or more types of windshield wiper blades 35.

FIGS. 3 to 6 show various views of a pin style attachment adapter 55 according to an embodiment. The pin style attachment adapter 55 includes a body 60 having a threaded bore 65 on one side and a pin 70 on the other side. The threaded bore 65 is for attachment to the handle 45 and the pin 70 is for attachment with a windshield wiper blade 35. In some cases, the body 60 may be tapered from the bore side to the pin side. In some cases, the body 60 may also have a filleted top 75 around the pin 70. In some cases, the attachment adapter 50 may be affixed to the handle 45 rather than screwed onto the handle or may be attached to the handle using a different attachment system as may be known in the art.

FIGS. 7 to 10 show various views of a J-style attachment adapter 80 according to an embodiment. Similar to the pin style attachment adapter 55, the J-style attachment adapter 80 includes a body 60 having a threaded bore 65 on one side for attachment to the handle 45. Instead of the pin 70, the J-style attachment adapter 80 includes a shaped slot 85 on the other side from the threaded bore side. The shaped slot 85 is for attachment with windshield wiper blades 35 of the type using a J-hook or hook-slot type of connector.

Figure 11A:
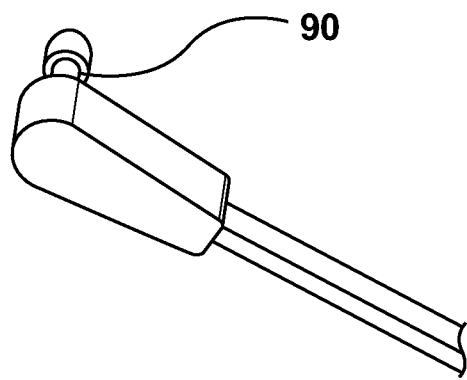
FIG. 11 shows alternate windshield wiper blade attachments.
Figure 11B:
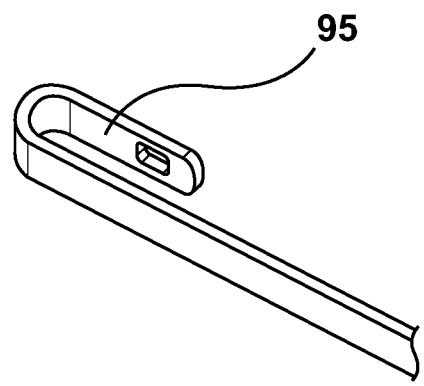
Figure 11C:
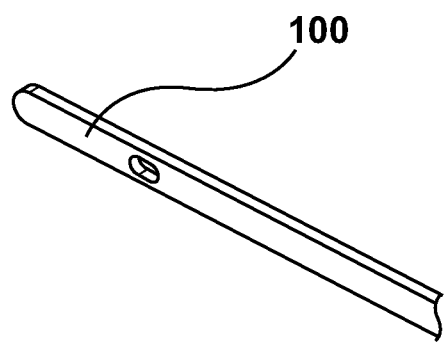
Figure 11D:
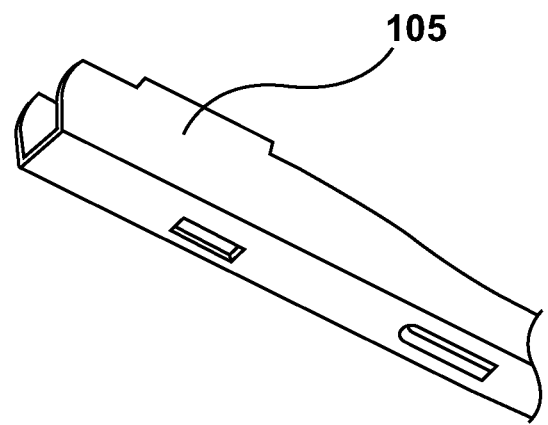
Figure 11E:
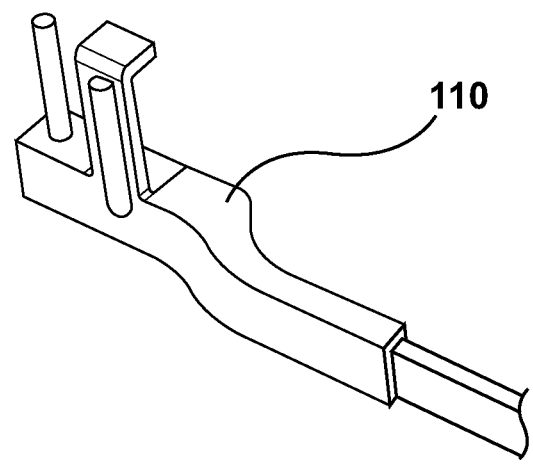

The embodiments shown herein may include different attachment adaptors 50, however, it will be understood that the present disclosure is not limited to the specific attachment adaptors above. FIG. 11 illustrates various types of wiper blade attachments of the type that could be used or developed for use with attachment adaptors. FIGS. 11A and 11B illustrate the type of attachments used in the pin and J-style attachment adaptors above, in particular FIG. 11A shows a pin style attachment 90 and FIG. 11B shows a J-style attachment 95. FIGS. 11C, 11D, and 11E illustrate a bayonet arm style attachment 100, a push button arm style attachment 105, and a standard pin & hook arm style attachment 110, that could be used with an attachment adaptor 50. Embodiments of attachment adaptors may be developed for other types of windshield wiper blade attachment mechanisms as would be understood by one of skill in the art.

Figure 12:
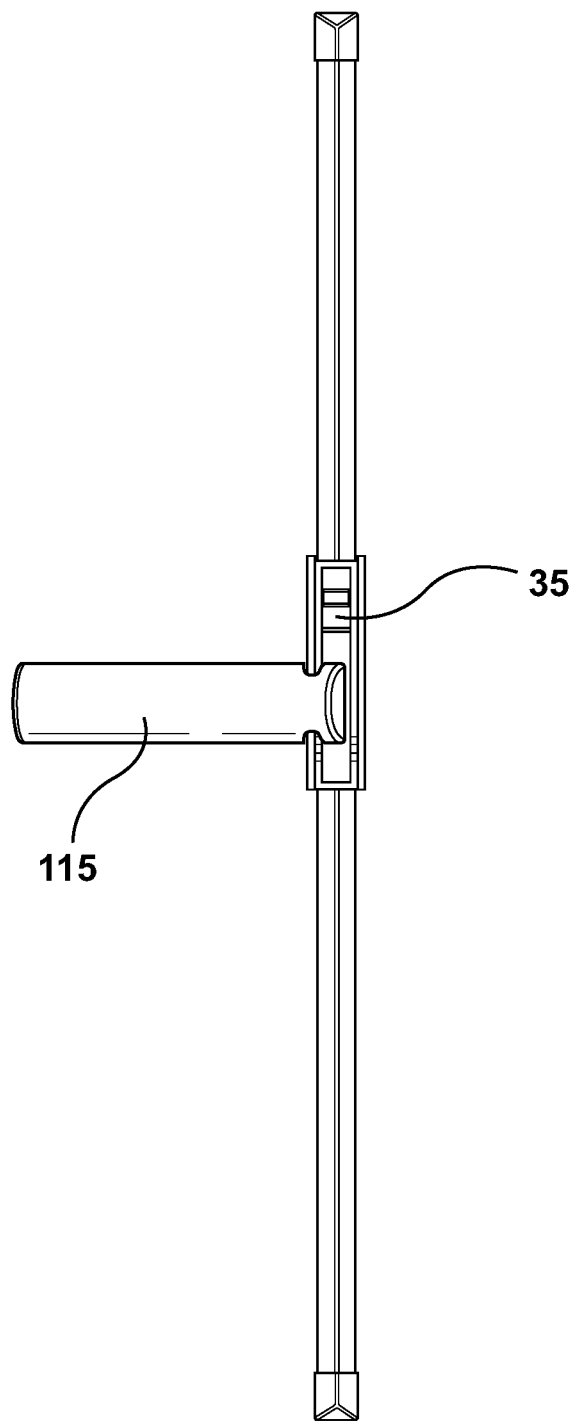
FIG. 12 shows another close up view of a head of the glass cleaning device of FIG. 1.

FIG. 12 shows an attachment adapter 50 attached to a replaceable windshield wiper 35 using a J-style attachment adapter 115.

Figure 13A:
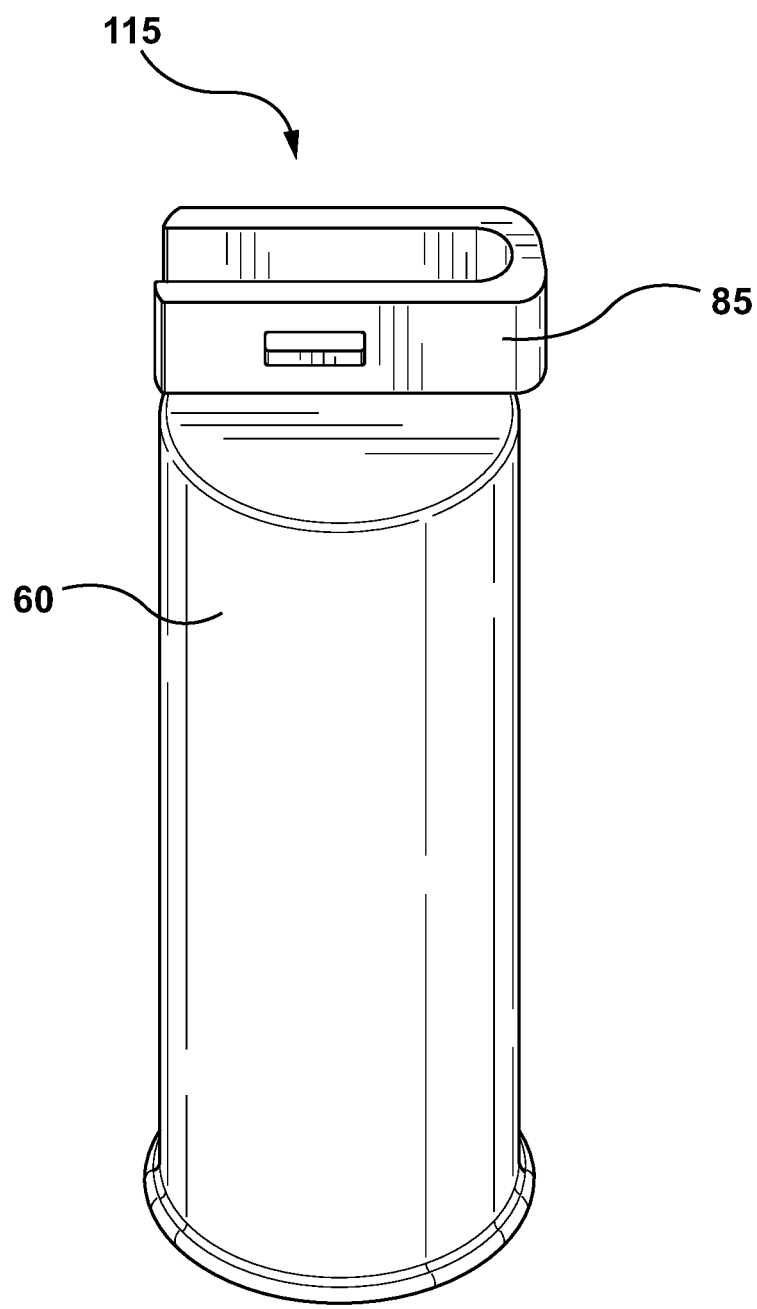
FIG. 13A shows a perspective view of a J-clip style attachment adapter according to an embodiment.
Figure 13B:
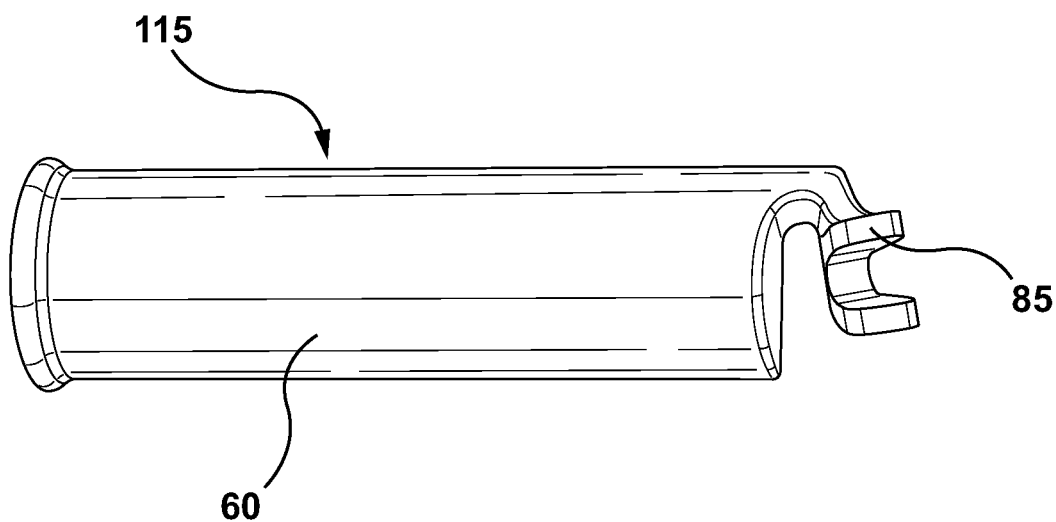
FIG. 13B shows a side view of the J-clip style attachment adapter of FIG. 13A.
Figure 13C:
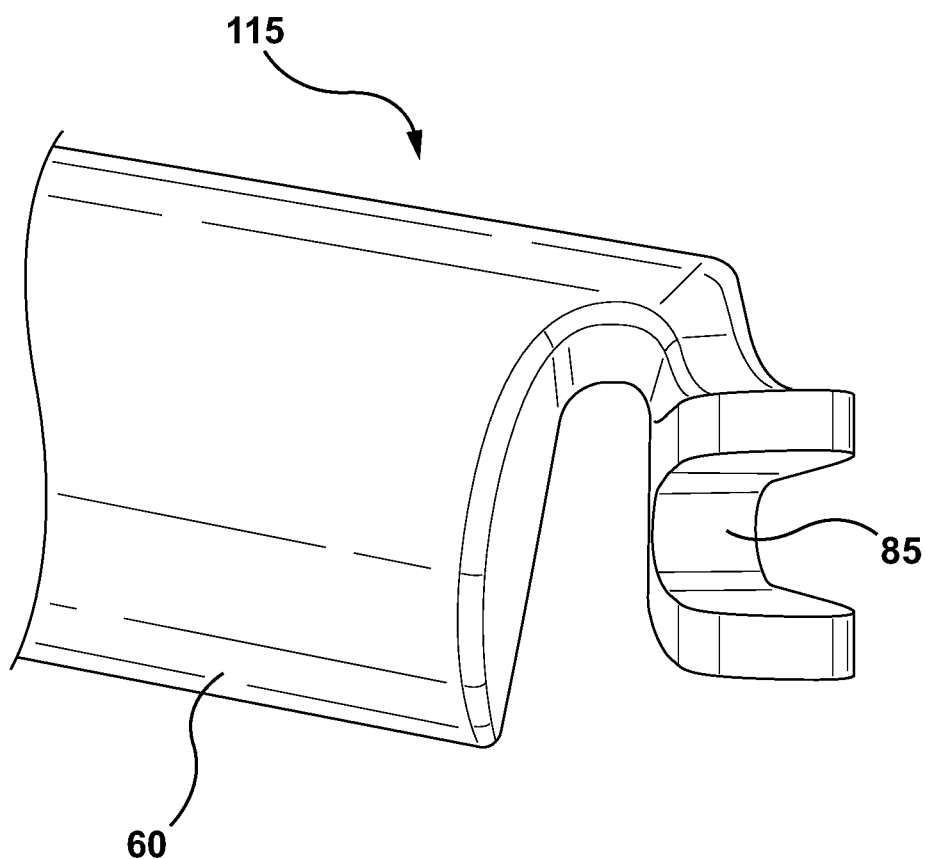
FIG. 13C shows a close up side view of the J-clip style attachment adapter of FIG. 13A.

FIGS. 13A to 13C show various views of a J-style attachment adapter 115 according to an embodiment. The J-style attachment adapter of the present embodiment may be similar in some ways to the J-style attachment adapter of FIGS. 7 to 10. In particular, the J-style attachment adapter 115 includes a body 60 having a shaped slot 85 on one side. The shaped slot 85 is for attachment with windshield wiper blades 35 of the type using a J-hook or hook-slot type of connector. The J-style attachment adapter 115 may have a threaded bore on the other side from the shaped slot side for attachment to the handle 45, either temporarily or permanently.

Embodiments herein are intended to provide a cost-effective and efficient glass cleaning device. In particular, the glass cleaning device is intended to allow for easy replacement of the cleaning blade using readily available windshield wiper blades (such as those for vehicles) rather than less easily replaceable or more difficult to find curved squeegee heads or the like. If the handle is extendable, the glass cleaning device will also be effective to reach higher or difficult to reach windows, windshields or window portions. Further, by providing a removable attachment adapter, it is possible to change the attachment adapter depending on the type of windshield wiper blade that may be available or required for a particular purpose. Embodiments herein can provide an effective device for cleaning windows or windshields, and, in particular, curved windows or windshields on buildings, vehicles (such as buses, industrial equipment, aircraft and the like), and the like.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

I claim:

1. A hand-held glass cleaning device consisting of:
    a pole-shaped handle; and
    a J-style attachment adaptor attached to the pole-shaped handle and configured to receive a J-style replaceable windshield wiper blade of the type available for vehicles;
    wherein the J-style attachment adaptor includes a body having a threaded bore on one side for attachment to the pole-shaped handle and a shaped slot on another end of the adaptor away from the threaded bore for attachment to a J-hook connected to the J-style replacement windshield wiper blade.

2. The hand-held glass cleaning device of claim 1 wherein the pole-shaped handle is extendible.

3. The hand-held glass cleaning device of claim 1 wherein the attachment adapter is removable.

4. The hand-held glass cleaning device of claim 3 wherein the J-style attachment adaptor is configured to attach to the pole-shaped handle via a threaded bore.

5. The hand-held glass cleaning device of claim 1 further comprising an initial windshield wiper blade attachable to the J-style attachment adapter.

6. The hand-held glass cleaning device of claim 1 wherein the pole-shaped handle is a cylindrical pole.

* * * * *